(12) United States Patent
Monibi et al.

(10) Patent No.: US 10,536,440 B2
(45) Date of Patent: Jan. 14, 2020

(54) USER ACCOUNT ACCESS MANAGEMENT

(71) Applicant: Disney Enterprises, Inc., Burbank, CA (US)

(72) Inventors: Mohamad H. Monibi, Glendale, CA (US); Alexander Romanelli, Phoenix, AZ (US)

(73) Assignee: Disney Enterprises, Inc., Burbank, CA (US)

( * ) Notice: Subject to any disclaimer, the term of this patent is extended or adjusted under 35 U.S.C. 154(b) by 144 days.

(21) Appl. No.: 15/791,143

(22) Filed: Oct. 23, 2017

(65) Prior Publication Data
US 2019/0124056 A1 Apr. 25, 2019

(51) Int. Cl.
H04L 29/06 (2006.01)
G06F 21/62 (2013.01)
G06F 21/10 (2013.01)

(52) U.S. Cl.
CPC .............. H04L 63/06 (2013.01); G06F 21/10 (2013.01); G06F 21/62 (2013.01); H04L 63/083 (2013.01); H04L 63/0838 (2013.01); H04L 63/0853 (2013.01); H04L 63/102 (2013.01)

(58) Field of Classification Search
CPC ... H04L 63/083; H04L 63/06; H04L 63/0838; H04L 63/0853; H04L 63/102; G06F 21/10; G06F 21/62
See application file for complete search history.

(56) References Cited

U.S. PATENT DOCUMENTS 8,718,633 B2 5/2014 Sprigg
8,874,770 B2 10/2014 Ruff
9,230,076 B2 1/2016 King
9,351,193 B2 5/2016 Raleigh
9,491,176 B1 11/2016 Jaini
(Continued)

FOREIGN PATENT DOCUMENTS

WO WO2013112642 8/2013
WO 2015/189833 12/2015

OTHER PUBLICATIONS

Jang, William, Adil Chhabra, and Aarathi Prasad. "Enabling multi-user controls in smart home devices." Proceedings of the 2017 Workshop on Internet of Things Security and Privacy. pp. 49-54. ACM, 2017. (Year: 2017).*

(Continued)

Primary Examiner — Kari L Schmidt
(74) Attorney, Agent, or Firm — Farjami & Farjami LLP

(57) ABSTRACT

A user account access management system includes a computing platform having a hardware processor and a system memory storing a user account access software code. The hardware processor executes the user account access software code to receive, from a first user device, a secondary account profile data for generating a secondary account associated with a primary user account registered with a web based service, and to receive, from a second user device, a sign up request for using the web based service. The hardware processor further executes the user account access software code to transmit an authentication token to one of the first user device and the second user device, receive the authentication token from the other of the first user device and the second user device, and link the secondary account with the second user device based on receiving the authentication code.

17 Claims, 12 Drawing Sheets

(56) References Cited

U.S. PATENT DOCUMENTS

| | | | | |
|---|---|---|---|---|
| 9,516,099 | B1* | 12/2016 | Engelberg | H04L 67/10 |
| 9,557,889 | B2 | 1/2017 | Raleigh | |
| 9,578,182 | B2 | 2/2017 | Raleigh | |
| 9,626,720 | B2* | 4/2017 | Robbin | G06Q 20/40 |
| 10,091,207 | B2* | 10/2018 | Chao | H04L 63/08 |
| 10,108,950 | B2* | 10/2018 | Wetzel | G06Q 20/29 |
| 2002/0049806 | A1* | 4/2002 | Gatz | G06F 21/62 |
| | | | | 709/203 |
| 2005/0086126 | A1* | 4/2005 | Patterson | A63F 13/12 |
| | | | | 705/26.8 |
| 2005/0228680 | A1 | 10/2005 | Malik | |
| 2005/0283372 | A1* | 12/2005 | Jorgenson | G06Q 30/012 |
| | | | | 726/28 |
| 2008/0086764 | A1 | 4/2008 | Kulkarni | |
| 2008/0305832 | A1 | 12/2008 | Greenberg | |
| 2009/0192904 | A1* | 7/2009 | Patterson | G06Q 20/20 |
| | | | | 705/17 |
| 2010/0125652 | A1 | 5/2010 | Rantapuska | |
| 2012/0130853 | A1* | 5/2012 | Petri | G06Q 30/0609 |
| | | | | 705/26.35 |
| 2013/0159121 | A1 | 6/2013 | May | |
| 2013/0219517 | A1* | 8/2013 | Yerli | H04L 63/10 |
| | | | | 726/28 |
| 2013/0254070 | A1* | 9/2013 | Jones | G06Q 20/3278 |
| | | | | 705/26.41 |
| 2014/0214640 | A1 | 7/2014 | Mallikarjunan | |
| 2015/0081837 | A1* | 3/2015 | Bernier | H04W 8/24 |
| | | | | 709/217 |
| 2015/0347769 | A1* | 12/2015 | Espinosa | G06F 21/62 |
| | | | | 726/28 |
| 2015/0348185 | A1* | 12/2015 | Frost | G06Q 40/02 |
| | | | | 705/35 |
| 2015/0350220 | A1* | 12/2015 | Espinosa | H04L 63/102 |
| | | | | 726/28 |
| 2016/0358180 | A1* | 12/2016 | Van Os | G06Q 20/3278 |
| 2017/0149795 | A1 | 5/2017 | Day | |
| 2017/0186008 | A1* | 6/2017 | Pachouri | G06Q 20/4014 |
| 2017/0200160 | A1* | 7/2017 | Kumar | G06Q 20/405 |

OTHER PUBLICATIONS

Lampinen, Airi MI. "Account sharing in the context of networked hospitality exchange." Proceedings of the 17th ACM conference on Computer supported cooperative work & social computing. pp. 499-504.ACM, 2014. (Year: 2014).*

Whalen, Tara, Diana Smetters, and Elizabeth F. Churchill. "User experiences with sharing and access control." CHI'06 extended abstracts on Human factors in computing systems. pp. 1517-1522. ACM, 2006. (Year: 2006).*

Pachal, Pete. "What Google Did Right and Wrong With Family Link," Mashable.com, Mar. 15, 2017. pp. 1-9.

Baig, Edward C. "Google App Lets Parents Control Their Kids' Smartphone Time," *USA Today*, Mar. 15, 2017.pp. 1-7.

* cited by examiner

USER ACCOUNT ACCESS MANAGEMENT

BACKGROUND

There are situations in which a primary account holder may wish to enable other members of a group to have access to selected assets of the primary account. For example, in many households, one person, often a parent, is a primary account holder who owns and manages access to digital content, such as digital movie content. Access to the digital content is typically attached to that primary account holder's credentials. Sharing the digital content with other members of the family often involves giving full access to the primary account holder's credentials on devices used by other family members. Moreover, in instances where third-party Identity Providers (IDPs) such as Facebook® or Google® are used to authenticate a user, enabling access to the primary account may undesirably include providing full access to those third-party accounts as well.

SUMMARY

There are provided systems and methods for managing user account access, substantially as shown in and/or described in connection with at least one of the figures, and as set forth more completely in the claims.

DETAILED DESCRIPTION

Figure 1:
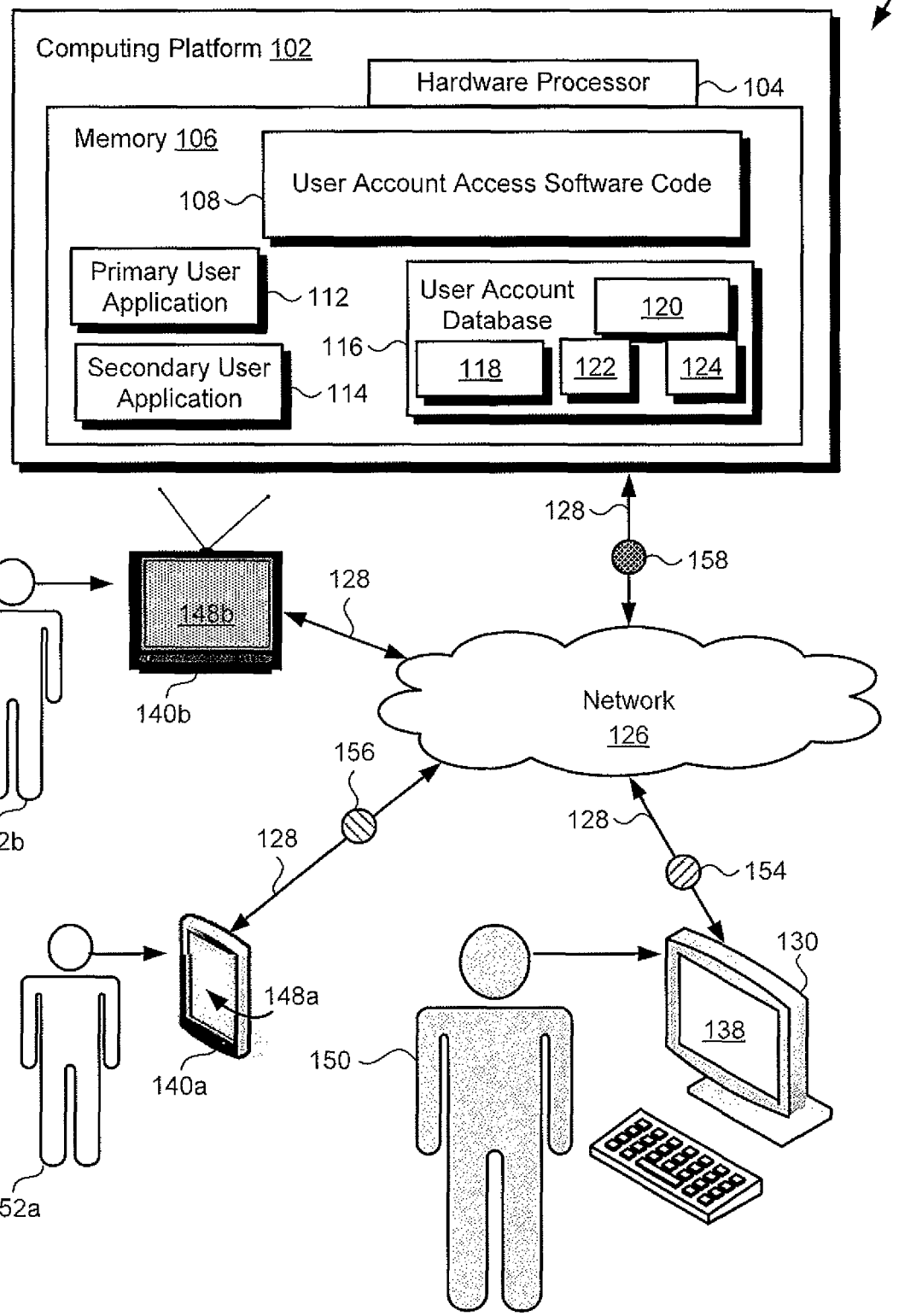
FIG. 1 shows a diagram of an exemplary user account access management system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for managing user account access. The user account access management solution of the present disclosure links a device used by a group or family member to a secondary account of a primary user account, without granting full access to the primary user account or disclosing third-party identity credentials. The user account access management solution of the present disclosure also provides for the ability to lock access to assets of the primary user account by the device used by the group or family member based on restrictions included in secondary account profile data used to generate the secondary account.

The linking process involves one device that is authenticated on the primary user account (hereinafter "first user device"), one or more non-authenticated device or devices (hereinafter "second user device(s)"), and a system for coordinating and managing account access. An authentication token, which may include a unique sequence of numbers, letters, and/or symbols is generated remotely by a user account access software code executed by a hardware processor of the system, and is transmitted to one of the first and second user devices.

The authentication token may then be transferred between the first and second user devices via manual entry, or through other means such as optical character recognition, barcode scanning, or even wirelessly, using technologies such as WiFi-Direct, Bluetooth, and near-field communication (NFC), to name a few examples. Transfer of the authentication token between the first and second user devices, and subsequent communication with the remote system enables the user account access software code to associate the first and second user devices with each other. The appropriate authorization credentials can then be transferred to the second user device, thereby linking the second user device to a secondary account generated specifically for the user of the second user device.

FIG. 1 shows a diagram of exemplary user account access management system 100, according to one implementation. User account access management system 100 includes computing platform 102 having hardware processor 104 and system memory 106 implemented as a non-transitory memory. As shown in FIG. 1, system memory 106 stores user account access software code 108, primary user application 112, secondary user application 114, and user account database 116.

As further shown in FIG. 1, user account database 116 includes primary user accounts 118 and 120, and secondary accounts 122 and 124 associated with primary user account 120. In addition, FIG. 1 shows first user device 130 utilized by owner 150 of primary user account 120, and one or more second user device(s) 140a and 140b utilized by respective one or more secondary user(s) 152a and 152b. As shown in FIG. 1, first user device 130 and one or more second user device(s) 140a and 140b are in communication with computing platform 102 via communication network 126 and network communication links 128. Also shown in FIG. 1 are secondary account profile data 154, sign up request 156, authentication token 158, and displays 138, 148a, and 148b of respective first user device 130 and second user devices 140a and 140b.

According to the implementation shown in FIG. 1, owner 150 of primary user account 120 may utilize first user device 130 and communication network 126 to interact with user account software code 108 stored on system memory 106. Such an interaction may include providing, using first user device 130, secondary account profile data 154 for generating secondary account 122 and/or 124 associated with primary user account 120.

In some implementations, user account access management system 100 may correspond to one or more web servers providing a web based service, such as a digital movie service or other web based service providing digital content, for example. In those implementations, primary user account 120 may be registered with the web based service, and may enable owner 150 of primary user account 120 to access all movies or other digital content to which owner 150 holds digital rights through primary user account 120. It is noted that, although FIG. 1 depicts user account access software code 108, primary user application 112, secondary user application 114, and user account database 116 as being mutually co-located in system memory 106, that representation is merely provided as an aid to conceptual clarity. More generally, user account access management system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within user account access management system 100. Thus, it is to be understood that user account access software code 108 and/or primary user application 112 and/or secondary user application 114 and/or user account database 116 may be stored remotely from one another within the distributed memory resources of user account access management system 100.

It is further noted that, although first user device 130 is depicted as a personal computer (PC) in FIG. 1, while second user devices 140a and 140b are depicted as a smartphone and smart television (smart TV), respectively, those representations are also merely exemplary. More generally, any or all of first user device 130 and second user devices 140a and 140b may be implemented as any suitable mobile or stationary computing device or system. For instance, in various implementations, first user device 130 and second user devices 140a and 140b may take the form of any of a laptop computer, tablet computer, smartphone, or smart TV, or smartwatch to name a few exemplary devices. It is also noted that displays 138, 148a, and 148b of respective first user device 130 and second user devices 140a and 140b may take the form of liquid crystal displays (LCDs), light-emitting diode (LED) displays, organic light-emitting diode (OLED) displays, or other suitable display screens that performs a physical transformation of signals to light.

Figure 2:
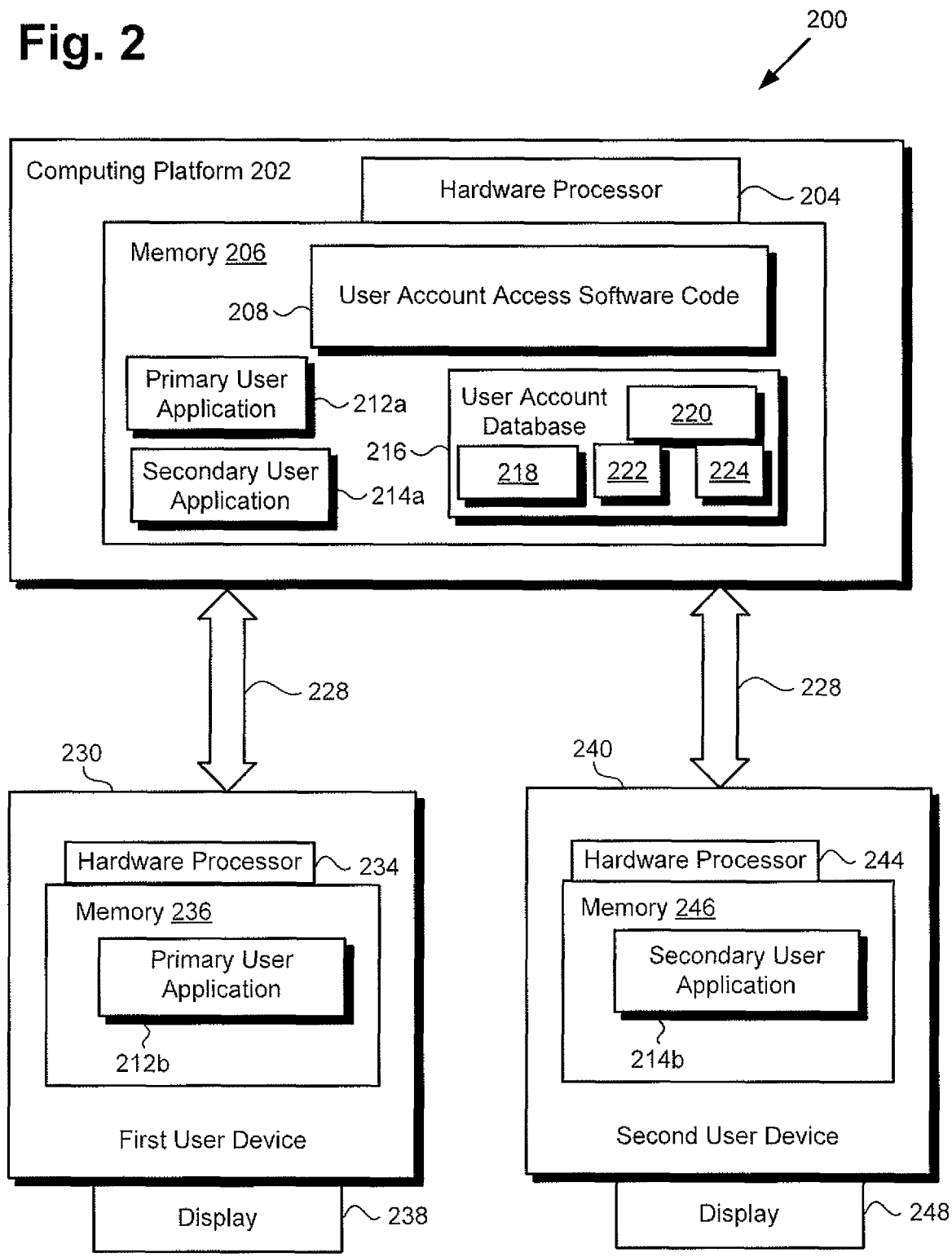
FIG. 2 shows another exemplary implementation of a user account access management system.

FIG. 2 shows another exemplary implementation of user account access management system 200, in combination with a more detailed exemplary representation of first user device 230 and second user device 240. User account access management system 200 includes computing platform 202, which is shown to be interactively coupled to first user device 230 and second user device 240 over network communication links 228.

Computing platform 202 includes hardware processor 204, and system memory 206 storing user account access software code 208, primary user application 212a, secondary user application 214a, and user account database 216. As shown in FIG. 2, user account database 216 includes primary user accounts 218 and 220, and secondary accounts 222 and 224 associated with primary user account 220. As further shown in FIG. 2, first user device 230 includes hardware processor 234, memory 236 storing primary user application 212b, and display 238. Also shown in FIG. 2 is second user device 240 including hardware processor 244, memory 246 storing secondary user application 214b, and display 248.

Network communication links 228, and user account access management system 200 including computing platform 202 having hardware processor 204 and system memory 206, correspond in general to network communication links 128, and user account access management system 100 including computing platform 102 having hardware processor 104 and system memory 106, in FIG. 1, and those corresponding features may share any of the characteristics attributed to either corresponding feature by the present disclosure. In addition, user account access software code 208, primary user application 212a, secondary user application 214a, user account database 216, primary user accounts 218 and 220, and secondary accounts 222 and 224, in FIG. 2, correspond in general to user account access software code 108, primary user application 112, secondary user application 114, user account database 116, primary user accounts 118 and 120, and secondary accounts 122 and 124, in FIG. 1. In other words, those corresponding features may share any of the characteristics attributed to either corresponding feature by the present disclosure.

First user device 230 having display 238 corresponds in general to first user device 130 having display 138, in FIG. 1, and those corresponding features may share any of the characteristics attributed to either corresponding feature by the present disclosure. That is to say, although not shown in FIG. 1, first user device 130 may include features corresponding respectively to hardware processor 234 and memory 236 storing primary user application 212b, while display 238 may take the form of an LCD, an LED display, an OLED display, or another suitable display screen that performs a physical transformation of signals to light. Moreover, primary user application 212b corresponds in general to primary user application 112/212a, and any of those corresponding features may share the characteristics attributed to any corresponding feature by the present disclosure.

Second user device 240 having display 248 corresponds in general to either or both of second user devices 140a and 140b having respective displays 148a and 148b, in FIG. 1, and those corresponding features may share any of the characteristics attributed to either corresponding feature by the present disclosure. Thus, although not shown in FIG. 1, second use devices 140a and 140b may include features corresponding respectively to hardware processor 244 and memory 246 storing secondary user application 214b, while display 248 may take the form of an LCD, an LED display, an OLED display, or another suitable display screen that performs a physical transformation of signals to light. Furthermore, secondary user application 214b corresponds in general to secondary user application 114/214a, and each of those corresponding features may share the characteristics attributed to any corresponding feature by the present disclosure.

According to the exemplary implementation shown in FIG. 2, primary user application 212b is located in memory 236 of first user device 130/230, having been received from user account access management system 100/200 via network communication link 128/228. In one implementation, network communication link 128/228 corresponds to transfer of primary user application 212b over a packet-switched network, for example, such as the Internet. Once transferred, for instance by being downloaded over network communication link 128/228, primary user application 212b may be persistently stored in memory 236 and may be executed locally on first user device 130/230 by hardware processor 234, to facilitate interaction with user account access software code 108/208. That is to say, first user device 130/230 can utilize primary user application 212b to communicate with user account access software code 108/208 so as to provide secondary account profile data 154, and/or to receive authentication token 158.

Also according to the exemplary implementation shown in FIG. 2, secondary user application 214b is located in memory 246 of second user device 140a/140b/230, having been received from user account access management system 100/200 via network communication link 128/228. As noted above by reference to primary user application 212b, in one implementation, network communication link 128/228 corresponds to transfer of secondary user application 214b over a packet-switched network such as the Internet. Once transferred, for instance by being downloaded over network communication link 128/228, secondary user application 214b may be persistently stored in memory 246 and may be executed locally on second user device 140a/140b/240 by hardware processor 244, to facilitate interaction with user account access software code 108/208.

Figure 3:
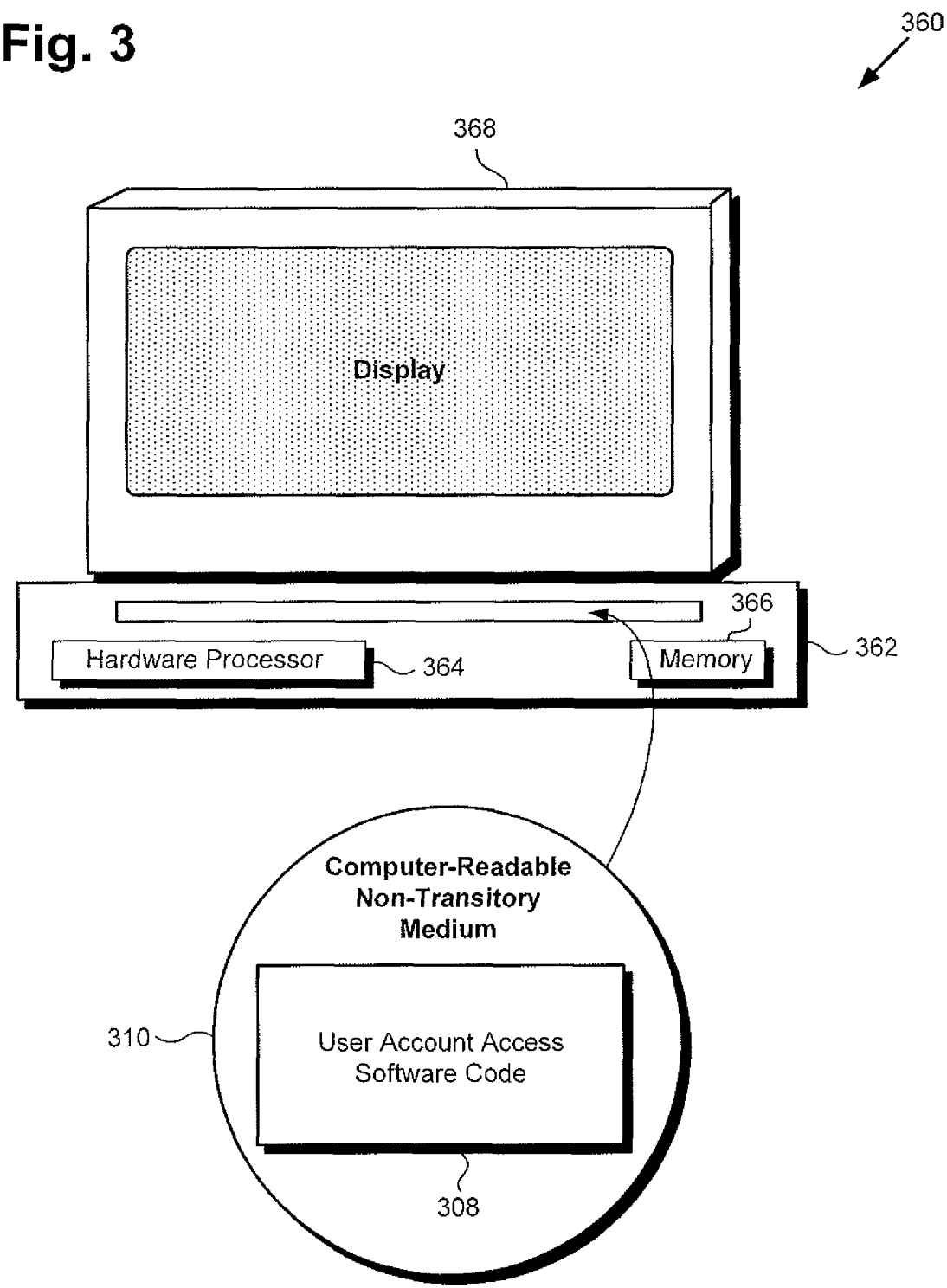
FIG. 3 shows an exemplary system and a computer-readable non-transitory medium including instructions for managing user account access.

FIG. 3 shows exemplary system 360 and a computer-readable non-transitory medium including instructions for managing user account access, according to one implementation. System 360 includes computing platform 362 having hardware processor 364 and system memory 366, interactively linked to display 368. Display 368 may take the form of an LCD, an LED display, an OLED display, or another suitable display screen that performs a physical transformation of signals to light. System 360 including computing platform 362 having hardware processor 364 and system memory 366 corresponds in general to user account access management system 100/200 including computing platform 102/202 having hardware processor 104/204 and system memory 106/206, in FIG. 1/2, and those corresponding features may share the characteristics attributed to any of the corresponding features by the present disclosure.

Also shown in FIG. 3 is computer-readable non-transitory medium 310 having user account access software code 308 stored thereon. The expression "computer-readable non-transitory medium," as used in the present application, refers to any medium, excluding a carrier wave or other transitory signal, that provides instructions to hardware processor 364 of computing platform 362. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 310 provides user account access software code 308 for execution by hardware processor 364 of system 360. User account access software code 308 corresponds in general to user account access software code 108/208, in FIGS. 1 and 2, and is capable of performing all of the operations attributed to those corresponding features by the present disclosure.

Figure 4:
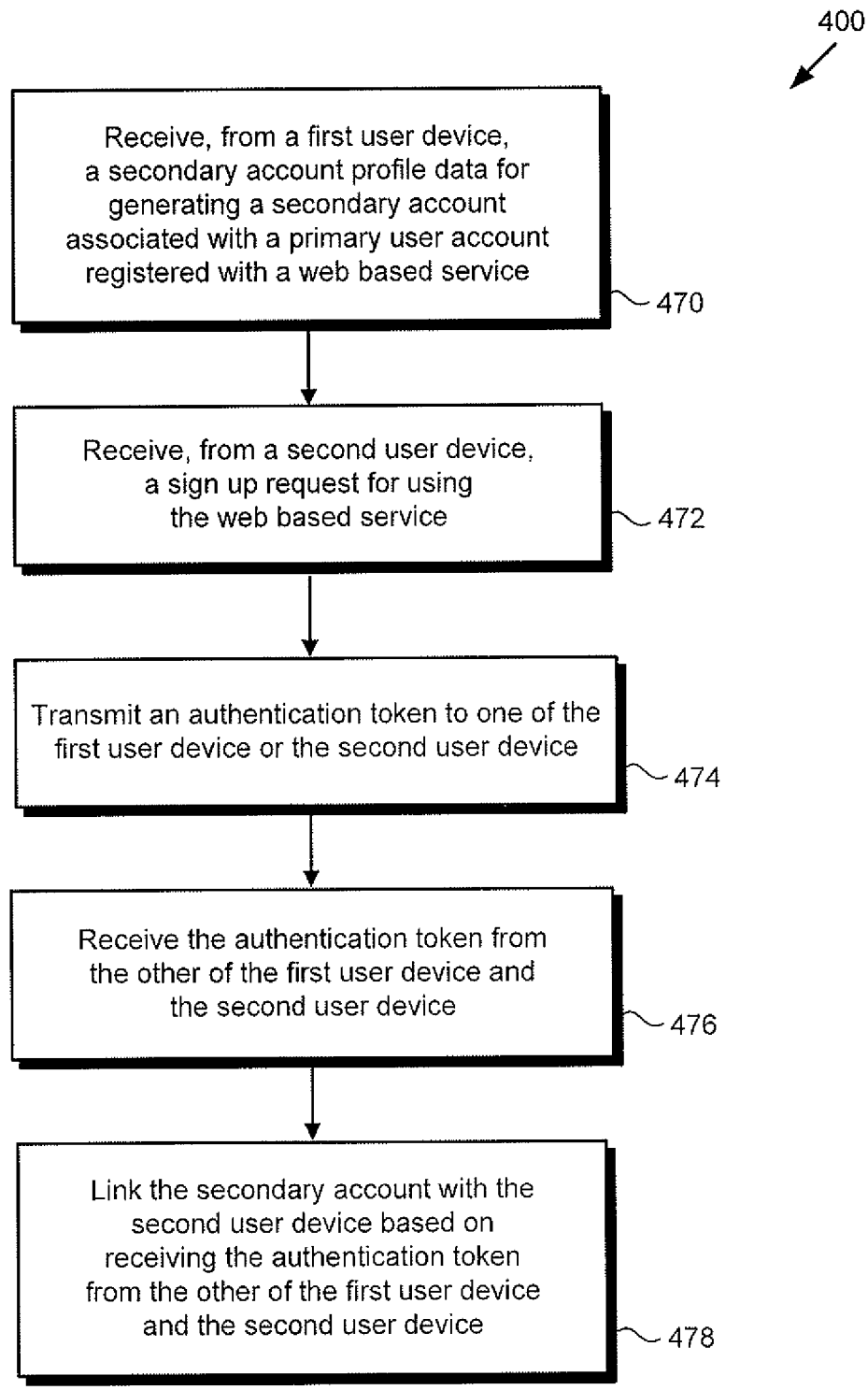
FIG. 4 is a flowchart presenting an exemplary method for use by a system to manage user account access.

The systems for managing user account access discussed above by reference to FIGS. 1, 2, and 3, will be further described below with reference to FIG. 4. FIG. 4 presents flowchart 400 outlining an exemplary method for use by a system to manage user account access.

Flowchart 400 begins with receiving, from first user device 130/230, secondary account profile data 154 for generating secondary account 122/222 or 124/224 associated with primary user account 120/220 registered with a web based service (action 470). As noted above, user account access management system 100/200 may correspond to one or more web servers providing a web based service, such as a digital movie service or other web based service providing digital content, for example. In those implementations, primary user account 120/220 may be registered with the web based service, and may enable owner 150 of primary user account 120/220 to access all movies or other digital content to which owner 150 holds digital rights through primary user account 120/220.

Secondary account profile data 154 may include identification data for secondary account 122/222 or 124/224, such as data selecting a name for the secondary account, and/or an avatar or other representative image for the secondary account. In addition, secondary account profile data 154 may include one or more content filters for restricting access to some of the content held in primary user account 120/220. For example, where content held in primary user account 120/220 includes movie content, secondary account profile data 154 may include restrictions based on Motion Picture Association of America (MPAA) ratings, or other criteria identified by owner 150.

Moreover, in some implementations, secondary account profile data 154 may include restrictions on purchase features and/or access to social functions available through primary user account 120/220. Thus, secondary account profile data 154 may include restrictions enabling a second user device linked to secondary account 122/222 or 124/224, such as second user device 140a/140b/240, limited access to content presently held in primary user account 120/220, and may further prevent second user device 140a/140b/240 from engaging in commercial transactions using secondary account 122/222 or 124/224, such as the purchase of new content.

Secondary account profile data 154 may be received by user account access software code 108/208/308 of system 100/200/360, executed by hardware processor 104/204/364. As shown in FIGS. 1 and 2, secondary account profile data 154 may be received by user account access software code 108/208/308 from primary user application 212b of first user device 130/230 via communication network 126 and network communication links 128/228.

Figure 5A:
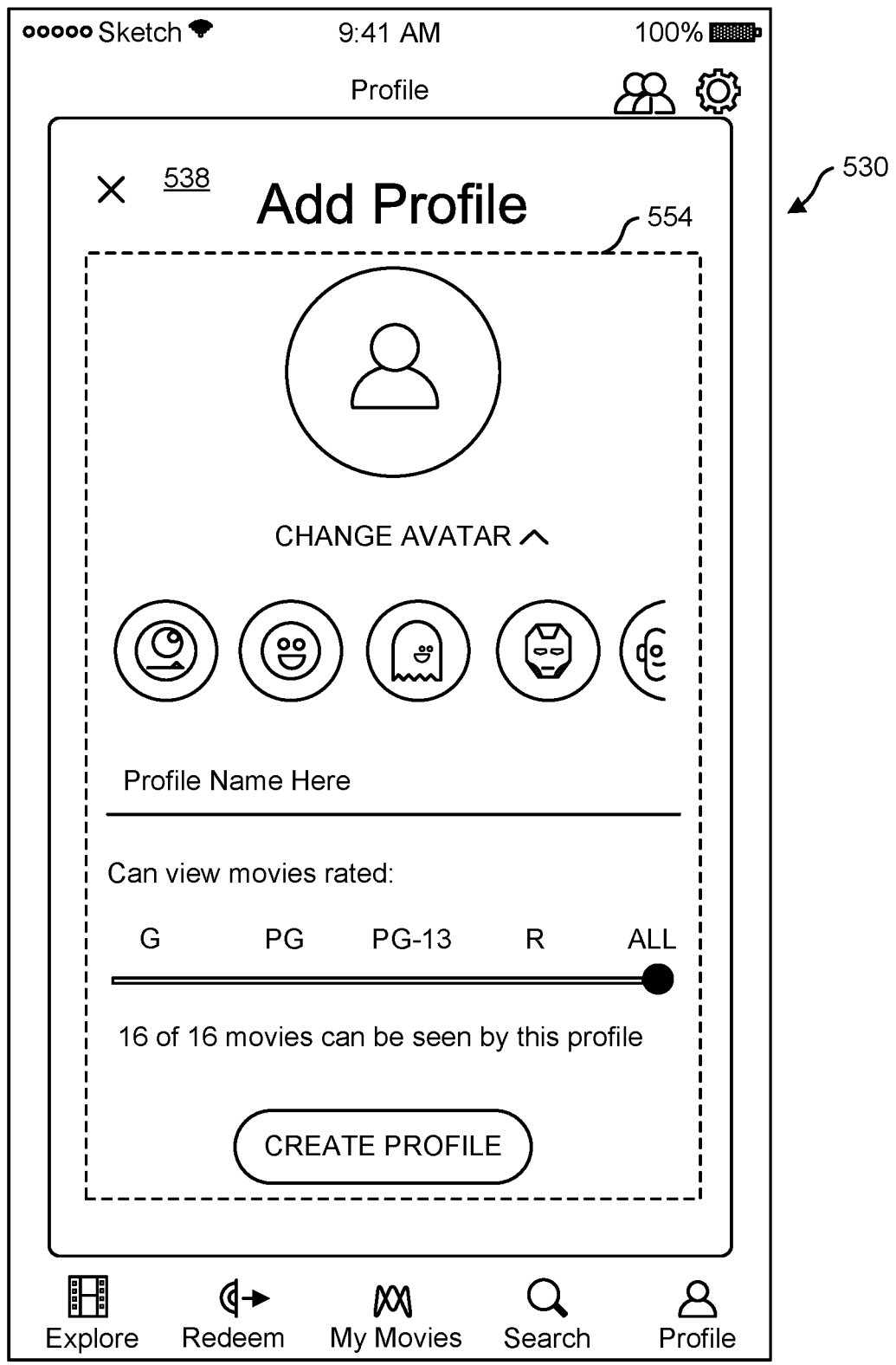
FIG. 5A shows an exemplary input screen of a first user device for entering secondary account profile data for generating a secondary account associated with a primary user account, according to one implementation.

FIG. 5A depicts an exemplary input screen shown on display 538 of first user device 530 for entering secondary account profile data 554, according to one implementation. Secondary account profile data 554 corresponds in general to secondary account profile data 154, in FIG. 1, and those corresponding features may share any of the characteristics attributed to either corresponding feature by the present disclosure. In addition, first user device 530 including display 538 corresponds in general to first user device 130/230 including display 138/238, in FIGS. 1 and 2, and those corresponding features may share any of the characteristics attributed to either corresponding feature by the present disclosure.

According to the exemplary implementation shown in FIG. 5A, secondary account profile data 154/554 can be provided by inputs from owner 150 to first user device 130/230/530 selecting an avatar and profile name for secondary account 122/222 or 124/224. As also shown by FIG. 5A, secondary account profile data 154/554 can include access restrictions to movie content held in primary user account 120/220 based on MPAA ratings. For example, in the exemplary implementation of FIG. 5A, a user of secondary account 122/222 or 124/224 has unrestricted access to the movie content held in primary user account 120/220. The interactive screen shown on display 138/238/538 of first user device 130/230/530 in FIG. 5A may be provided by primary user application 212*b*, executed by hardware processor 234 of first user device 130/230/530.

Flowchart 400 continues with receiving, from second user device 140*a*/140*b*/240, sign up request 156 for using the web based service with which primary user account 120/220 is registered (action 472). Sign up request 156 may be received by user account access software code 108/208/308 of system 100/200/360, executed by hardware processor 104/204/364. As shown in FIGS. 1 and 2, sign up request 156 may be received by user account access software code 108/208/308 from second user device 140*a*/140*b*/240 via communication network 126 and network communication links 128/228.

Figure 5B:
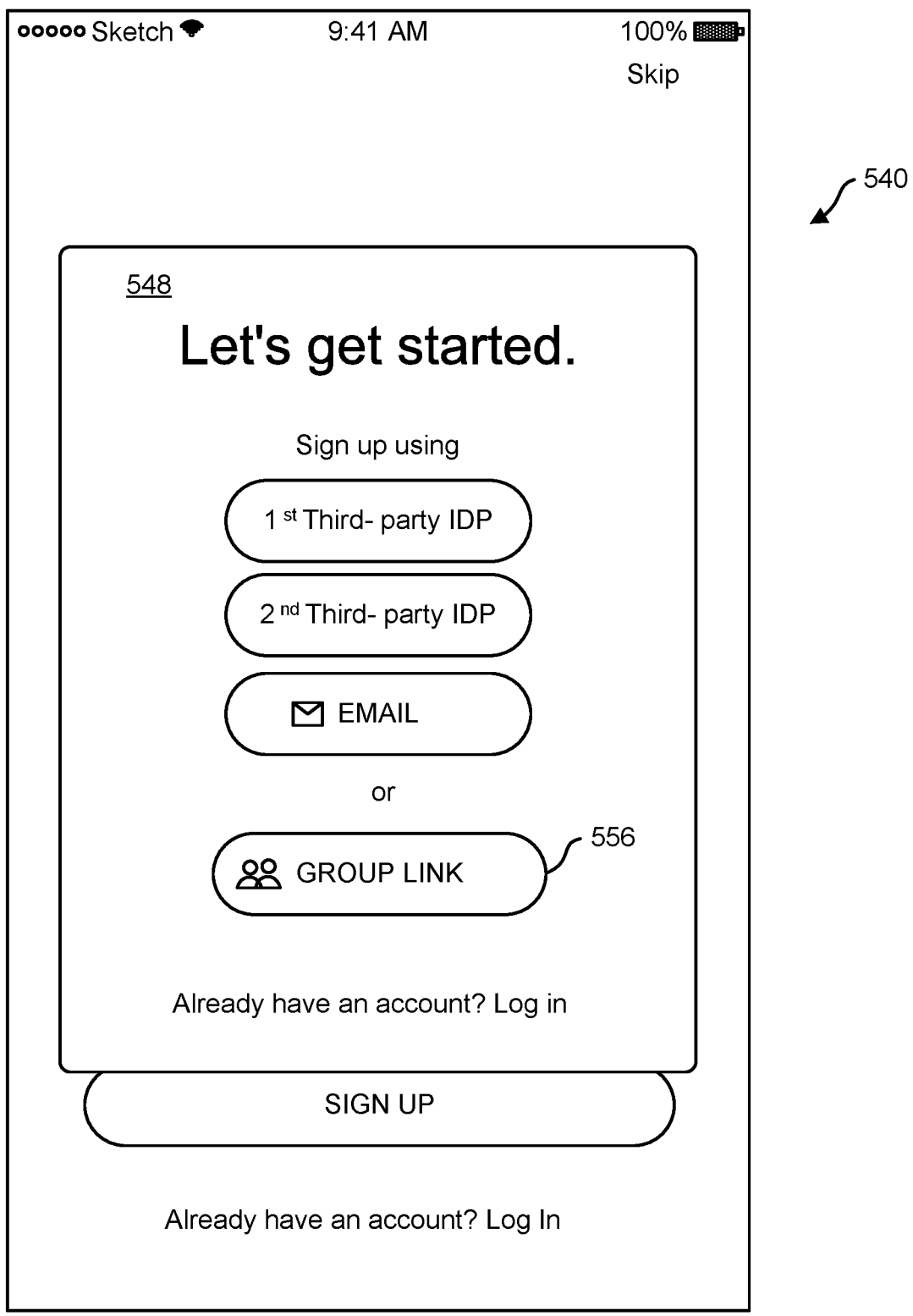
FIG. 5B shows an exemplary login screen of a second user device for entering a sign up request for accessing assets held in the primary user account, according to one implementation.

FIG. 5B depicts an exemplary login screen shown on display 548 of second user device 540 for submitting sign up request 556, according to one implementation. Sign up request 556 corresponds in general to sign up request 156, in FIG. 1, and those corresponding features may share any of the characteristics attributed to either corresponding feature by the present disclosure. In addition, second user device 540 including display 548 corresponds in general to second user device 140*a*/140*b*/240 including display 148*a*/148*b*/248, in FIGS. 1 and 2, and each of those corresponding features may share the characteristics attributed to any of the corresponding features by the present disclosure.

According to the exemplary implementation shown in FIG. 5B, the login screen shown on display 148*a*/148*b*/248/548 of second user device 140*a*/140*b*/240/540 includes options for a primary user account holder, such as owner 150, to login of second user device 140*a*/140*b*/240/540 using a third-party IDP such as Facebook® or Google®, for example, or to login via email. In addition, the login screen shown on display 148*a*/148*b*/248/548 enables a secondary user, such as one of secondary users 152*a* and 152*b*, to submit sign up request 156/556 for accessing content held in primary user account 120/220.

Flowchart 400 continues with transmitting authentication token 158 to one of first user device 130/230/530 and second user device 140*a*/140*b*/240/540 (action 474). Authentication token 158 may be transmitted to first user device 130/230/530 or second user device 140*a*/140*b*/240/540 by user account access software code 108/208/308 of system 100/200/360, executed by hardware processor 104/204/364. As shown in FIG. 1, authentication token 158 may be transmitted to first user device 130/230/530 or second user device 140*a*/140*b*/240/540 via communication network 126 and network communication links 128/228.

Figure 5C:
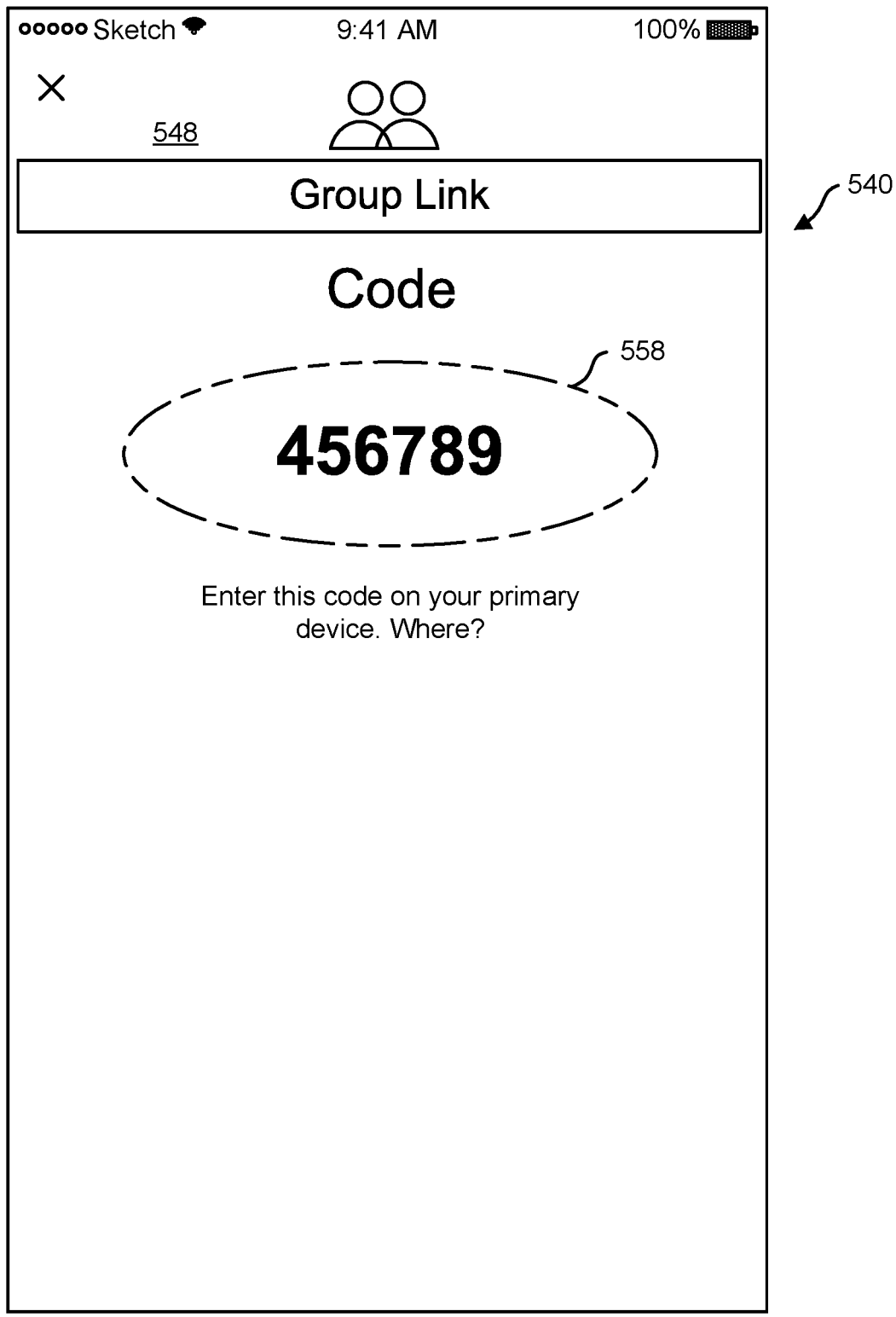
FIG. 5C depicts an exemplary display screen of the second user device displaying an authentication token received from a system for managing user account access, according to one implementation.

FIG. 5C depicts exemplary authentication token 558 shown on display 148*a*/148*b*/248/548 of second user device 140*a*/140*b*/240/540 after transmission of authentication token 558 to second user device 140*a*/140*b*/240/540, according to one implementation. Authentication token 558 corresponds in general to authentication token 158, in FIG. 1, and those corresponding features may share any of the characteristics attributed to either corresponding feature by the present disclosure. As shown in FIG. 5C, in one implementation authentication token 158/558 may be a unique sequence of numbers. However, in other implementations, authentication token 158/558 may be a unique sequence of symbols and/or alphanumeric characters.

It is noted that, although FIG. 5C, as well as subsequent FIGS. 5D, 5E, 5F, 5G, and 5H correspond to implementations in which authentication token 158/558 is transmitted to second user device 140*a*/140*b*/240/540 in action 474, that representation is merely by way of example. In other implementations, authentication token 158/558 may be transmitted to first user device 130/230/530 in action 474.

Flowchart 400 continues with receiving authentication token 158/558 from the other of first user device 130/230/530 and second user device 140*a*/140*b*/240/540 (action 476). That is to say, where authentication token 158/558 is transmitted to second user device 140*a*/140*b*/240/540 in action 474, authentication token 158/558 is received from first user device 130/230/530 in action 476. By analogy, where authentication token 158/558 is transmitted to first user device 130/230/530 in action 474, authentication token 158/558 is received from second user device 140*a*/140*b*/240/540 in action 476.

Authentication token 158/558 may be received by user account access software code 108/208/308 of system 100/200/360, executed by hardware processor 104/204/364. As shown in FIG. 1, authentication token 158/558 may be received by user account access software code 108/208/308 via communication network 126 and network communication links 128/228.

It is noted that, in order for authentication token 158/558 to be transmitted to one of first user device 130/230/530 and second user device 140*a*/140*b*/240/540, and then to be subsequently received from the other of first user device 130/230/530 and second user device 140*a*/140*b*/240/540, authentication token 158/558 must be transferred between first user device 130/230/530 and second user device 140*a*/140*b*/240/540. According to various implementations of the present inventive principles, authentication token 158/558 may be transferred locally between first user device 130/230/530 and second user device 140*a*/140*b*/240/540, or may be entered manually into the one of first user device 130/230/530 and second user device 140*a*/140*b*/240/540 to which authentication token 158/558 was not transmitted in action 474.

Continuing the example implementation in which authentication token 158/558 is transmitted to second user device 140*a*/140*b*/240/540 in action 474 and received from first user device 130/230/530 in action 476, authentication token 158/558 may be transferred locally to first user device 130/230/530, or input manually to first user device 130/230/530.

When transferred locally, for example, authentication token 158/558 may be input to first user device 130/230/530 via optical character recognition, barcode scanning, or via a wireless technology. For example, local transfer of authentication token 158/558 may be performed wirelessly using WiFi-Direct, Bluetooth, ZigBee, NFC, or 60 GHz wireless communication methods, among others.

Figure 5D:
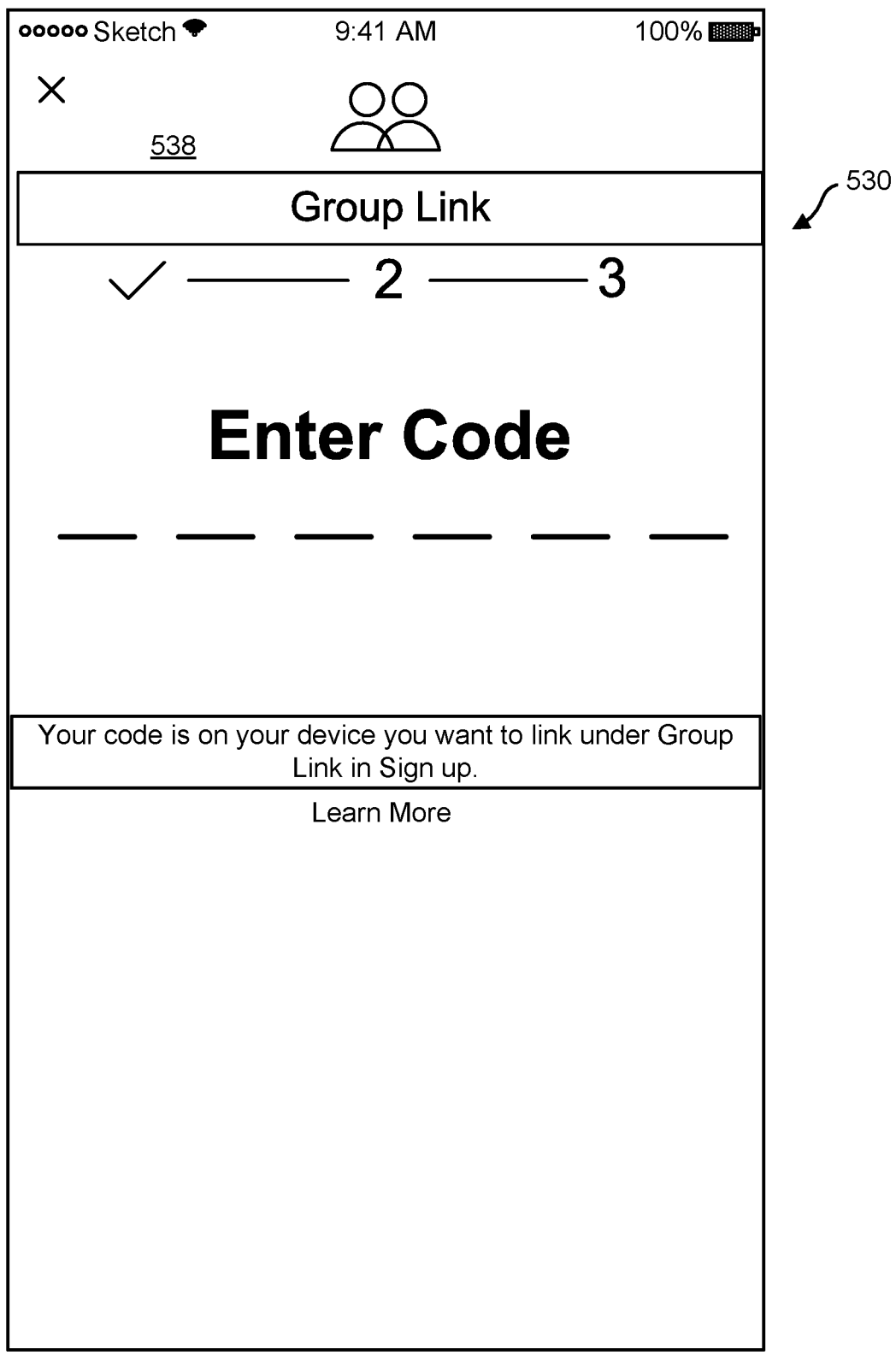
FIG. 5D shows another exemplary input screen of the first user device for entering the authentication token of FIG. 5C, according to one implementation.
Figure 5E:
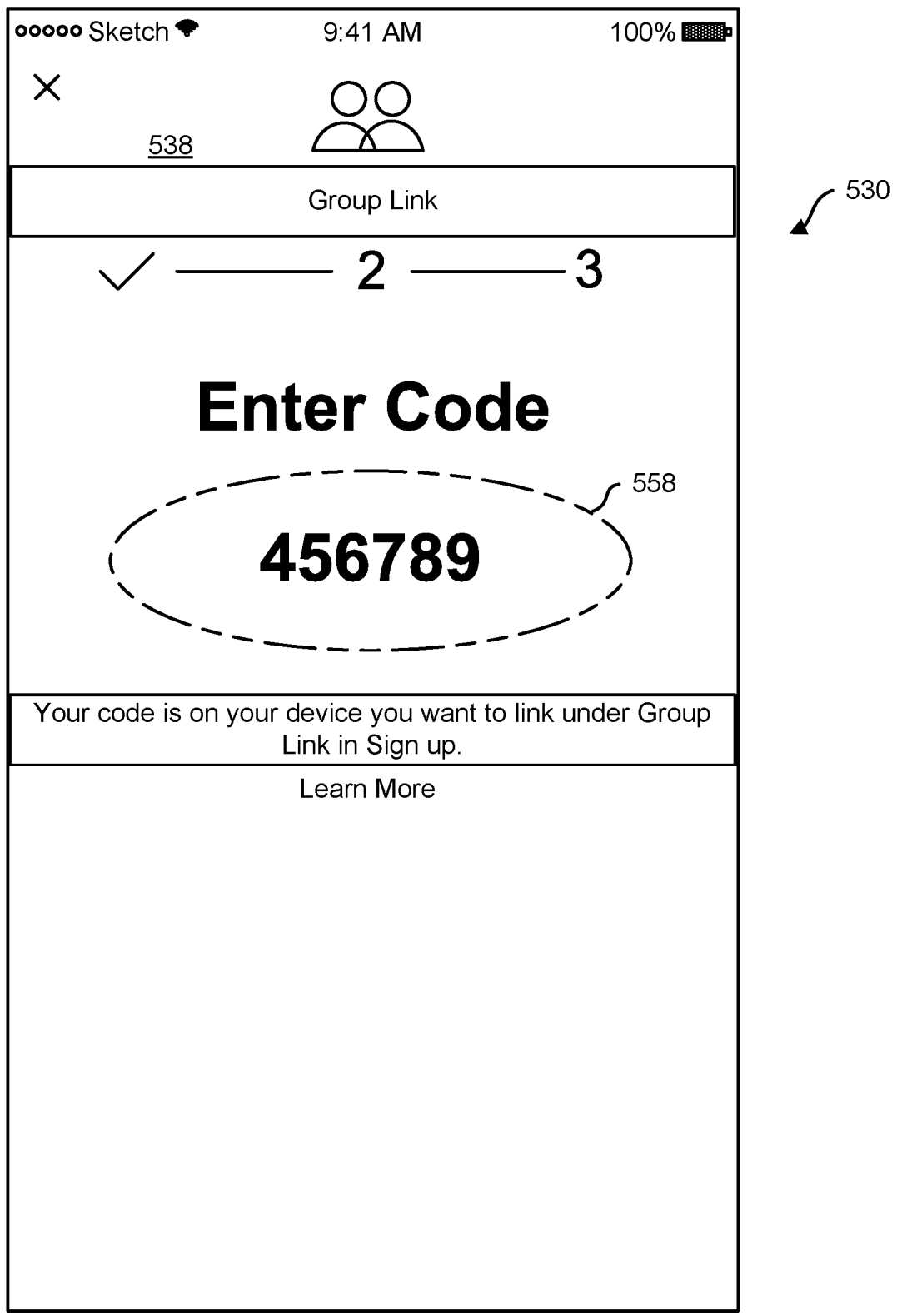
FIG. 5E shows the exemplary input screen of FIG. 5D after entry of the authentication token, according to one implementation.

FIG. 5D depicts exemplary display 138/238/538 of first user device 130/230/530 requesting entry of authentication token 158/558, while FIG. 5E shows display 138/238/538 of first user device 130/230/530 after entry of authentication token 158/558, according to one implementation. It is noted that FIGS. 5D and 5E correspond to an exemplary implementation in which authentication token 158/558 is entered manually into first user device 130/230/530. It is further noted that the interactive screens shown on display 138/238/538 of first user device 130/230/530 in FIGS. 5D and 5E, as well as in subsequent FIG. 5F, may be provided by primary user application 212b, executed by hardware processor 234 of first user device 130/230/530.

Flowchart 400 can conclude with linking secondary account 122/222 or 124/224 with second user device 140a/140b/240/540 based on receiving authentication token 158/558 in action 476 (action 478). Linking of secondary account 122/222 or 124/224 with second user device 140a/140b/240/540 may be performed by user account access software code 108/208/308 of system 100/200/360, executed by hardware processor 104/204/364. Moreover, in some implementations, as shown in FIG. 2, linking of secondary account 122/222 or 124/224 with second user device 140a/140b/240/540 may include providing secondary user application 214b for execution by hardware processor 244 of second user device 140a/140b/240/540.

Figure 5F:
FIG. 5F shows an exemplary success screen of the first user device confirming the linking of the secondary account with the second user device, according to one implementation.
Figure 5G:
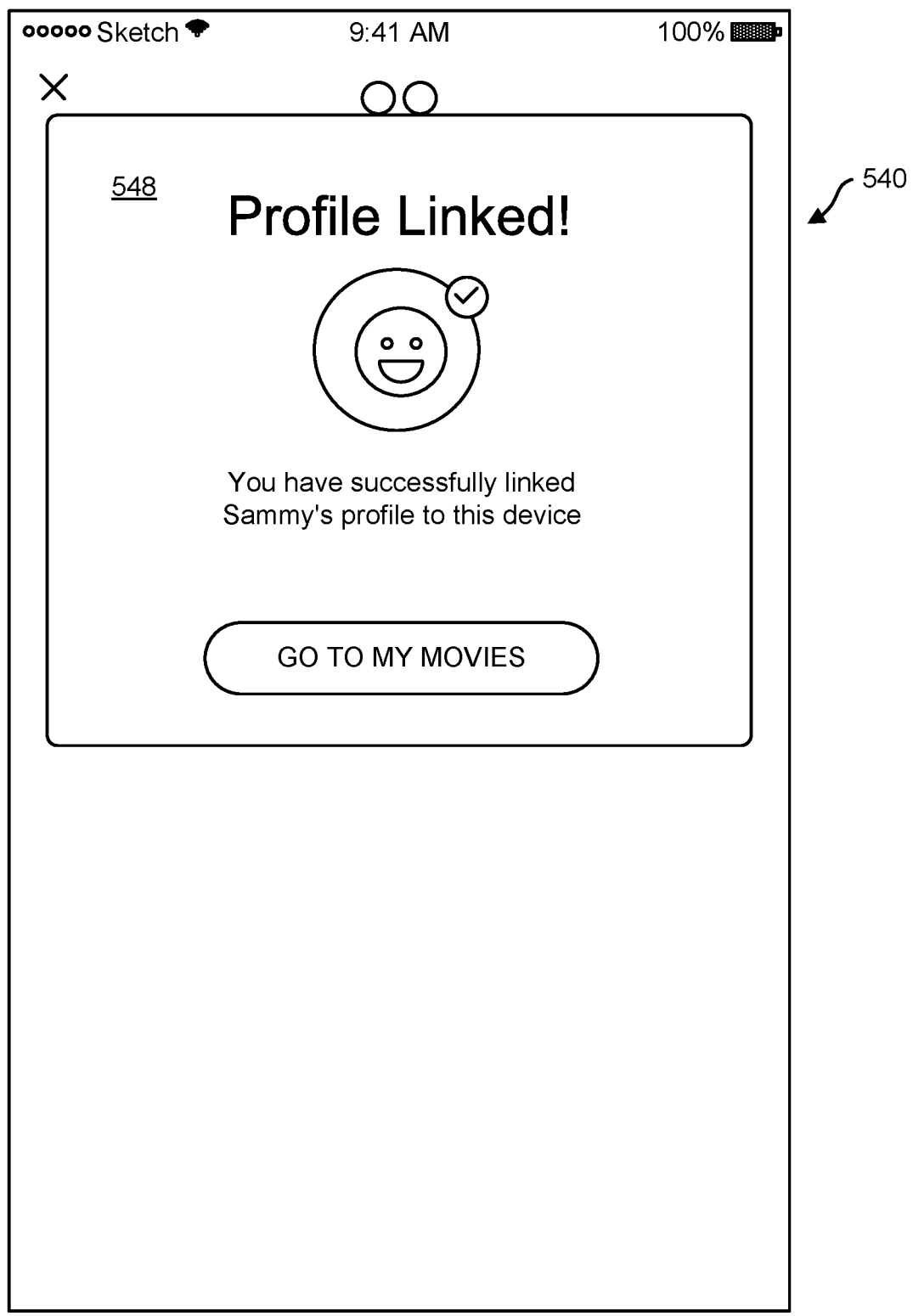
FIG. 5G shows an exemplary success screen of the second user device confirming the linking of the secondary account with the second user device, according to one implementation.

FIG. 5F depicts an exemplary success screen shown on display 138/238/538 of first user device 130/230/530 confirming the linking of secondary account 122/222 or 124/224 with second user device 140a/140b/240/540, while FIG. 5G shows an analogous success screen on display 148a/148b/248/548 of second user device 140a/140b/240/540, according to one implementation.

In some implementations, as discussed above, linking secondary account 122/222 or 124/224 with second user device 140a/140b/240/540 includes locking access to assets of primary user account 120/220 by second user device 140a/140b/240/540 based on restrictions included in secondary account profile data 154/554. Moreover, and as also discussed above, the restrictions included in secondary account profile data 154/554 may restrict access to media content to which owner 150 of primary user account 120/220 holds digital rights, and/or may restrict commercial transactions by second user device 140a/140b/240/540 utilizing secondary account 122/222 or 124/224.

In some implementations, primary user account 120/220 may be associated with more than one secondary account. For example, as shown in FIGS. 1 and 2, primary user account 120/220 may be associated with secondary account 122/222 and may be independently associated with another secondary account 124/224. In those implementations, hardware processor 104/204/364 of system 100/200/360 may further execute user account access software code 108/208/308 to receive identification data identifying which of secondary account 122/222 or 124/224 to link with second user device 140a/140b/240/540.

Figure 5H:
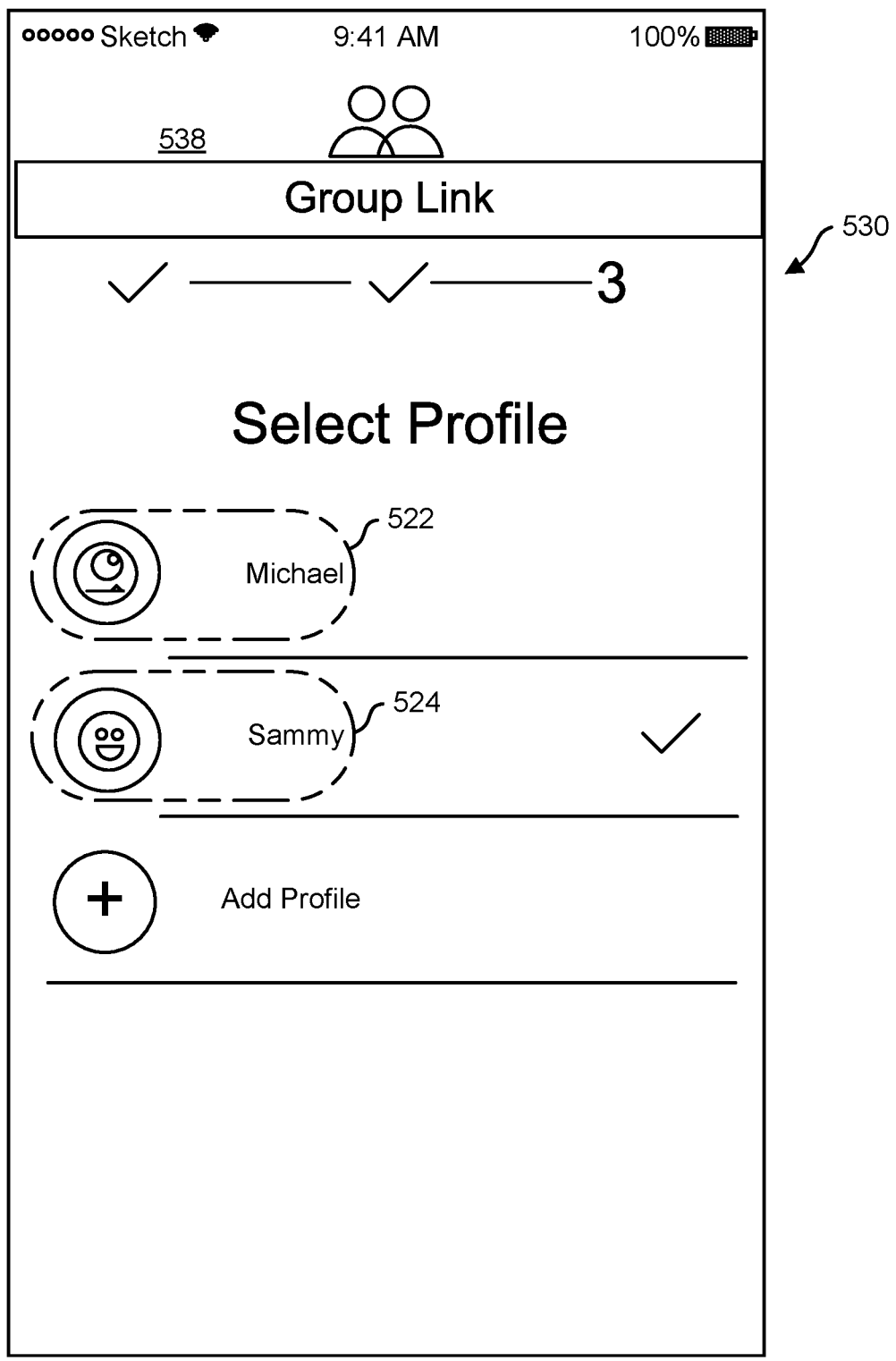
FIG. 5H shows yet another exemplary input screen of the first user device for identifying the secondary account for linking with the second user device, according to one implementation.

FIG. 5H depicts an exemplary input screen shown on display 138/238/538 of first user device 130/230/530 for identifying the secondary account for linking with the second user device 140a/140b/240/540, according to one implementation. The interactive screen shown on display 138/238/538 of first user device 130/230/530, in FIG. 5H, may be provided by primary user application 212b, executed by hardware processor 234 of first user device 130/230/530.

According to the exemplary implementation shown in FIG. 5H, owner 150 utilizes first user device 130/230/530 to send identification data 524 identifying secondary account 124/224 for linking with second user device 140a/140b/240/540. Also shown in FIG. 5H is identification data 522 identifying secondary account 122/222. Identification data 524 may be received by user account access software code 108/208/308 from primary user application 212b of first user device 130/230/530, via communication network 126 and network communication links 128/228.

It is noted that in implementations in which primary user account 120/220 is associated with more than on secondary account, linking a particular secondary account with the second user device may include preventing linking of the second user device with another secondary account associated with the primary user account. For example, where identification data 524 is used to identify secondary account 124/224 for linking with second user device 140a/140b/240/540, and where linking occurs in action 478, that linking may prevent concurrent linking of second user device 140a/140b/240/540 with secondary account 122/222.

It is further noted that the user account access management solutions described above may be adapted to meet a variety of different use cases. For example, the method of flowchart 400 can be adapted to enable linking of a secondary account with two primary user accounts, such as primary user accounts 118 and 120. As a specific example, primary user accounts 118 and 120 may be linked to one another, thereby enabling the respective owners of primary user accounts 118 and 120 to enjoy restricted or unrestricted access to the assets of the other primary user account. In those implementations, where a secondary account associated with primary user account 120, for example, is linked with a device utilized by a secondary user, i.e., second user device 140a/140b/240/540, that second user device may have access to the assets of both of primary user accounts 118 and 120, subject to the restrictions imposed by the owner of primary user account 120.

Thus, the present application discloses systems and methods for managing user account access. The present user account access management solution links a device used by a group or family member to a secondary account of a primary user account owned and controlled by a primary account holder, without granting full access to the primary user account or disclosing third-party identity credentials of the primary account holder. The present user account access management solution also advantageously provides for the ability to lock access to assets of the primary account by the device used by the group or family member based on restrictions included in secondary account profile data used to generate the secondary account.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A user account access management system, the system comprising:
   a computing platform having a hardware processor and a system memory storing a user account access software code;
   the hardware processor configured to execute the user account access software code to:
   receive, from a first user device authenticated on a primary user account, a secondary account profile data for generating a secondary account associated with the primary user account registered with a web based service;
   receive, from a second user device not authenticated on the secondary account, a sign up request to link the secondary account with the second user device for using the second user device to access assets of the primary user account via the web based service, the secondary account profile data including restrictions for accessing the assets of the primary user account;
   transmit, in response to the sign up request, an authentication token to the first user device;
   receive the authentication token from the second user device; and
   link the secondary account with the second user device based on receiving the authentication token from the second user device, wherein linking the secondary account with the second user device includes locking access to the assets of the primary user account by the second user device based on the restrictions included in the secondary account profile data.

2. The user account access management system of claim 1, wherein the restrictions restrict access to media content to which an owner of the primary user account holds digital rights.

3. The user account access management system of claim 1, wherein the restrictions restrict commercial transactions by the secondary account.

4. The user account access management system of claim 1, wherein the secondary account is one of a plurality of secondary accounts associated with the primary user account.

5. The user account access management system of claim 4, wherein the hardware processor is further configured to execute the user account access software code to receive an identification data identifying the secondary account for linking with the second user device.

6. The user account access management system of claim 4, wherein linking the secondary account with the second user device includes preventing linking of the second user device with another of the plurality of secondary accounts associated with the primary user account.

7. A method for use by a user account access management system including a hardware processor and a system memory storing a user account access software code, the method comprising:
   receiving from a first user device authenticated on a primary user account, using the hardware processor, a secondary account profile data for generating a secondary account associated with the primary user account registered with a web based service;
   receiving from a second user device not authenticated on the secondary account, using the hardware processor, a sign up request to link the secondary account with the second user device for using the second user device to access assets of the primary user account via the web based service, the secondary account profile data including restrictions for accessing the assets of the primary user account;
   transmitting, in response to the sign up request and using the hardware processor, an authentication token to the first user device;
   receiving, using the hardware processor, the authentication token from the second user device; and
   linking, using the hardware processor, the secondary account with the second user device based on receiving the authentication token from the second user device, wherein linking the secondary account with the second user device includes locking access to the assets of the primary user account by the second user device based on the restrictions included in the secondary account profile data.

8. The method of claim 7, wherein the restrictions restrict access to media content to which an owner of the primary user account holds digital rights.

9. The method of claim 7, wherein the restrictions restrict commercial transactions by the secondary account.

10. The method of claim 7, wherein the secondary account is one of a plurality of secondary accounts associated with the primary user account.

11. The method of claim 10, further comprising receiving an identification data identifying the secondary account for linking with the second user device.

12. The method of claim 10 or 11, wherein linking the secondary account with the second user device includes preventing linking of the second user device with another of the plurality of secondary accounts associated with the primary user account.

13. A computer-readable non-transitory medium having stored thereon instructions, which when executed by a hardware processor of a user account access management system, instantiate a method comprising:
   receiving, from a first user device authenticated on a primary user account, a secondary account profile data for generating a secondary account associated with the primary user account registered with a web based service;
   receiving, from a second user device not authenticated on the secondary account, a sign up request for using the web based service a sign up request to link the secondary account with the second user device for using the second user device to access assets of the primary user account via the web based service, the secondary account profile data including restrictions for accessing the assets of the primary user account;
   transmitting, in response to the sign up request, an authentication token to the first user device;
   receiving the authentication token from the second user device; and
   linking the secondary account with the second user device based on receiving the authentication token from the second user device, wherein linking the secondary account with the second user device includes locking access to the assets of the primary user account by the second user device based on the restrictions included in the secondary account profile data.

14. The computer-readable non-transitory medium of claim 13, wherein the restrictions restrict at least one of access to media content to which an owner of the primary user account holds digital rights, and commercial transactions by the secondary account.

15. The computer-readable non-transitory medium of claim 13, wherein the secondary account is one of a plurality of secondary accounts associated with the primary user account.

16. The computer-readable non-transitory medium of claim 15, further comprising receiving an identification data identifying the secondary account for linking with the second user device.

17. The computer-readable non-transitory medium of claim 15, wherein linking the secondary account with the second user device includes preventing linking of the second user device with another of the plurality of secondary accounts associated with the primary user account.

\* \* \* \* \*

UNITED STATES PATENT AND TRADEMARK OFFICE
CERTIFICATE OF CORRECTION

PATENT NO. : 10,536,440 B2  
APPLICATION NO. : 15/791143  
DATED : January 14, 2020  
INVENTOR(S) : Monibi et al.

Page 1 of 1

It is certified that error appears in the above-identified patent and that said Letters Patent is hereby corrected as shown below:

In the Claims

Column 12, Line 28, "claim 10 or 11," should be --claim 10,--

Signed and Sealed this
Fifteenth Day of July, 2025

Coke Morgan Stewart
*Acting Director of the United States Patent and Trademark Office*